(12) United States Patent
Goldsmith et al.

(10) Patent No.: US 9,268,204 B2
(45) Date of Patent: Feb. 23, 2016

(54) VERIFICATION OF LASER PROJECTOR SAFETY SYSTEM OPERATION

(71) Applicant: X-Laser LLC, Laurel, MD (US)

(72) Inventors: Daniel Goldsmith, Laurel, MD (US); Adam Raugh, Laurel, MD (US)

(73) Assignee: X-LASER LLC, Laurel, MD (US)

( * ) Notice: Subject to any disclaimer, the term of this patent is extended or adjusted under 35 U.S.C. 154(b) by 115 days.

(21) Appl. No.: 14/332,280

(22) Filed: Jul. 15, 2014

(65) Prior Publication Data

US 2016/0018258 A1 Jan. 21, 2016

(51) Int. Cl.
| | |
|---|---|
| *G03B 21/14* | (2006.01) |
| *G03B 21/20* | (2006.01) |
| *G01J 1/42* | (2006.01) |
| *G01J 11/00* | (2006.01) |
| *G03B 43/00* | (2006.01) |
| *G02B 26/10* | (2006.01) |
| *G02B 27/48* | (2006.01) |
| *H04N 3/22* | (2006.01) |

(Continued)

(52) U.S. Cl.
CPC ............ *G03B 21/2033* (2013.01); *G01J 1/4257* (2013.01); *G01J 11/00* (2013.01); *G02B 26/10* (2013.01); *G02B 27/48* (2013.01); *G03B 21/14* (2013.01); *G03B 43/00* (2013.01); *H01S 3/00* (2013.01); *H04N 3/22* (2013.01); *H04N 9/3129* (2013.01)

(58) Field of Classification Search
CPC .......... G02B 26/10; G02B 27/48; H04N 3/22; H04N 9/3129; H04N 2201/0438; H01S 3/00; G03B 21/2033
See application file for complete search history.

(56) References Cited

U.S. PATENT DOCUMENTS

| | | |
|---|---|---|
| 7,756,174 B2 | 7/2010 | Benner, Jr. |
| 7,911,412 B2 | 3/2011 | Benner, Jr. et al. |

(Continued)

FOREIGN PATENT DOCUMENTS

WO 2006101739 A2 9/2006

OTHER PUBLICATIONS

William R. Benner, Jr. "Making shows safe and enjoyable", Audience Scanning safety article, Laser Show Resource Guide, retrieved from http://www.pangolin.com/resguide09a.htm, Mar. 10, 2010, 7 pages.

(Continued)

*Primary Examiner* — Sultan Chowdhury
*Assistant Examiner* — Magda Cruz
(74) *Attorney, Agent, or Firm* — Brake Hughes Bellermann LLP

(57) ABSTRACT

In a general aspect, a method can include receiving a first projection pattern, where the first projection pattern is configured to violate a first parameter of a safety system of a laser projection system. The method can also include displaying the first projection pattern with the laser projection system and verifying proper implementation of the first parameter by the safety system based on visual appearance of the displayed first projection pattern. The method can further include receiving a second projection pattern, where the second projection pattern is configured to violate a second parameter of the safety system of the laser projection system and the second parameter is different than the first parameter. The method can further include displaying the second projection pattern with the laser projection system and verifying proper implementation of the second parameter by the safety system based on visual appearance of the displayed second projection pattern.

21 Claims, 6 Drawing Sheets

(51) Int. Cl.
H04N 9/31 (2006.01)
H01S 3/00 (2006.01)

(56) References Cited

U.S. PATENT DOCUMENTS 8,506,087 B2    8/2013  Benner, Jr. et al.
2008/0106654 A1*  5/2008  Benner ............... H04N 9/3129
                                                      348/745
2009/0147224 A1*  6/2009  Kurozuka ............ H04N 9/3129
                                                      353/98

OTHER PUBLICATIONS

SafetyScan Lens User Manual, Pangolin Laser Systems, retrieved from http://www.pangolin-quickshow.eu/pdf/SafetyScanManual.pdf, Apr. 11, 2012, 9 pages.

* cited by examiner

VERIFICATION OF LASER PROJECTOR SAFETY SYSTEM OPERATION

TECHNICAL FIELD

This description relates to laser projection systems. More specifically, this description relates to verifying proper operation of a safety system in an audience-scanning laser projector.

BACKGROUND

Projectors for producing scanning laser light show displays (laser projectors, laser projection systems, and so forth) can be generally defined as belonging to one of two groups: conventional laser light show projectors (conventional scanning laser projectors), and audience-scanning laser light show projectors (audience-scanning laser projectors). Both types of projectors typically utilize high powered laser sources (e.g., U.S. Food and Drug Administration (FDA) Class 3b or 4 laser sources) of various colors that can be directed (e.g., via an optical system) to, for example, a pair of mirrors that are attached to a pair of galvanometer scanners. Such galvanometer scanners can form an X-Y pair and be used to direct a laser beam or laser beams from the laser sources (e.g., through one or more lenses) to various pre-determined locations. The projections produced by the laser(s) may be used to produce graphics (static images) such as corporate logo designs and/or to produce (dynamic) animated images.

Graphics and/or animated images produced by conventional scanning laser projectors are intended to be projected onto a destination surface, such as a projection screen. In other instances, the graphics or images produced by such conventional scanning laser projectors can be projected onto/through an atmospheric scattering medium (e.g., fog from a fog machine) to make the beams of the laser(s) visible in mid-air. Laser beam projections produced by such conventional laser light projectors should terminate in a "safe" area that is away from viewers or audience members, such as onto a ceiling, onto a projection screen, or into open air (e.g., a night sky, assuming proper clearance from any appropriate regulatory agencies). The laser beams from such conventional scanning laser projectors should not be allowed to enter, or terminate in viewer or audience areas due to the potential eye hazards associated with high levels of irradiance which may occur from exposure to light from the high power laser sources.

Audience-scanning laser projectors, as compared to conventional scanning laser projectors, are designed to allow graphics and animated images produced by their laser beams to terminate in audience areas. For example, graphics or animated images produced by such audience-scanning laser projectors may be projected directly onto viewers or audience members. Similarly, an audience-scanning laser projector may be used to produce aerial beam effects through an atmospheric scattering medium, and those effects could then be directed toward audience areas, effectively immersing viewers in a laser projection effect (which can be referred to as "audience-scanning effects"). However, viewer eye safety and other legal liabilities may be concerns associated with the use of audience-scanning laser projectors. Accordingly, in some countries, it has been difficult to gain approval from regulatory agencies for the use of so-called "audience-scanning effects" produced by such audience-scanning laser projectors and procedures for verifying safe operation of such audience-scanning laser projectors.

A safety concern associated with the use of audience-scanning laser projectors is the possibility of retinal damage which may occur from exposure (e.g., a single exposure or multiple exposures) to the projected laser beam(s). For instance, if a laser beam of a sufficiently high irradiance is permitted to dwell at one point in space, e.g., where a viewer's eye may be located, for a sufficiently long period of time (e.g., remains at a given X-Y location for a specific period of time), retinal damage may occur. In some cases, even a few milliseconds of direct retinal exposure to a high power laser beam may be sufficient to cause injury.

Current approaches (e.g., procedures approved by the FDA) for evaluating the safety of a set of graphics and/or animated images that are to be used as audience-scanning effects are highly complex and highly prone to error. For example, such current approaches require the use of a beam power meter capable of measuring irradiance (beam power per unit area), a fast silicon photodiode, an oscilloscope, a scientific calculator, and sufficient skill of a user to properly use these instruments. Also, a number of current safety verification procedures actually require that a safety system of a laser projection system be disabled in order to obtain proper measurements, e.g., using the tools discussed above. Such approaches can be extremely time consuming and also can create a risk of the safety system not being reinitialized properly prior to use to produce audience-scanning effects. Accordingly, alternative, less complicated approaches for evaluating safe operation of audience-scanning laser projectors are desirable.

SUMMARY

According to one general aspect, a method can include receiving, at a laser projection system, a first projection pattern, where the first projection pattern is configured to violate a first parameter of a safety system of the laser projection system. The method can also include displaying the first projection pattern with the laser projection system and verifying proper implementation of the first parameter by the safety system based on visual appearance of the displayed first projection pattern. The method can further include receiving, at the laser projection system, a second projection pattern, where the second projection pattern is configured to violate a second parameter of the safety system of the laser projection system and the second parameter is different than the first parameter. The method can still further include displaying the second projection pattern with the laser projection system and verifying proper implementation of the second parameter by the safety system based on visual appearance of the displayed second projection pattern.

In example implementations, the method can include one or more of the following feature or aspects. The method can be performed prior to admission of an audience and projection of laser images onto the audience.

The method can include, if at least one of (a) the verification of the proper implementation of the first parameter fails or (b) the verification of the proper implementation of the second parameter fails, discontinuing use of the laser projection system.

The method can include determining that irradiance of a laser beam projected by the laser projection system at a nearest point of human access is less than or equal to a specified threshold value for the laser projection system. The determining can include measuring a distance from a lens of the laser projection system to the nearest point of human access. The determining can include measuring a width of a laser beam projected by the laser projection system at the nearest point of human access. The method can include, if at least one of (a) the verification of the proper implementation of the first parameter by the safety system fails, (b) the verification of the proper implementation of the second parameter by the safety system fails or (c) the determined irradiance of the laser beam is greater than the specified threshold, discontinuing use of the laser projection system.

The first parameter can be a dwell time threshold. The first projection pattern can include a geometric shape having at least one point that, if projected, would exceed the dwell time threshold. The first projection pattern can be a triangle with corners that, if projected, would exceed the dwell time threshold and the verifying proper implementation of the first parameter can include verifying that at least one corner of the triangle, when displayed, is dimmer than at least one other corner of the triangle. The at least one corner of the triangle that is dimmer can be displayed in a protected region of a scan field of the laser projection system.

The second parameter can be an angular velocity threshold. The second projection pattern can include a geometric shape that collapses from a first size to a second size, where the display of the second projection pattern at the second size can correspond with a laser beam angular velocity below the angular velocity threshold. The second pattern can be a circle, and the verifying proper implementation of the second parameter can include verifying that a portion of the circle at the second size is not displayed. The portion of the circle at the second size that is not displayed can correspond with a protected region of a scan field of the laser projection system.

In another general aspect, a method can include providing, to a laser projection system, a first projection pattern for display by the laser projection system. The first projection pattern can be configured to violate a first parameter of a safety system of the laser projection system. The method can also include verifying proper implementation of the first parameter based on visual appearance of the first projection pattern as displayed by the laser projection system. The method can further include, providing, to the laser projection system, a second projection pattern for display by the laser projection system. The second projection pattern can be configured to violate a second parameter of the safety system of the laser projection system, where the second parameter is different than the first parameter. The method can further include, verifying proper implementation of the second parameter based on visual appearance of the displayed second projection pattern as displayed by the laser projection system.

In example implementations, the method can include one or more of the following feature or aspects. The method can include, if at least one of (a) the verification of the proper implementation of the first parameter fails or (b) the verification of the proper implementation of the second parameter fails, discontinuing use of the laser projection system.

The method can include providing, to the laser projection system, a third projection pattern for display by the laser projection system and determining, based on the third projection pattern as displayed by the laser projection system, that irradiance of a laser beam of the laser projection system is less than or equal to a specified threshold value for the laser projection.

The method can include, if at least one of (a) the verification of the proper implementation of the first parameter fails, (b) the verification of the proper implementation of the second parameter fails or (c) the irradiance of the laser beam is greater than the specified threshold, discontinuing use of the laser projection system.

In another general aspect, a system can include a laser projector including a laser, an x-y scanning module and a safety system configured to implement a plurality of safety parameters. The system can further include a computing device including at least one processor and a non-transitory machine-readable medium having instructions stored thereon. The instructions, when executed by the at least one processor, can cause the computing device to provide, to the laser projector, a first projection pattern for display by the laser projector and verification of proper implementation of a first parameter of the plurality of parameters of the safety system, where the first projection pattern is configured to violate the first parameter. The instructions, when executed by the at least one processor, can cause the computing device to provide, to the laser projector, a second projection pattern for display by the laser projector and verification of proper implementation of a second parameter of the plurality of parameters of the safety system, where the second projection pattern is configured to violate the second parameter.

In example implementations, the system can include one or more of the following features. The first parameter can be an angular velocity threshold for the laser beam. The second parameter can be a dwell time threshold for the laser beam. The verification of the first projection patter and the verification of the second projection pattern can include visual inspection by a user in an event venue prior to arrival of at least one event attendee.

DETAILED DESCRIPTION

This document describes approaches for verifying proper operation of a safety system in a laser projection system that can be used for projecting graphics (static images) or animated (dynamic) images (hereafter, collectively "images") into viewer or audience occupied areas (e.g., an audience-scanning laser projection system), such as may be used in concert venues, sports venues, and the like. The procedures described herein can be used, e.g., by a user (such as a lighting technician), prior to admission of an audience into a viewing area into which images produced by such an audience-scanning laser projector will be projected, such as during an event. In other words, such verification procedures can be performed before allowing any humans to occupy an area into which an audience-scanning laser projector will be projecting images with one or more laser beams. Specific examples of such verification procedures are discussed below with respect to FIGS. 3-6.

Figure 1:
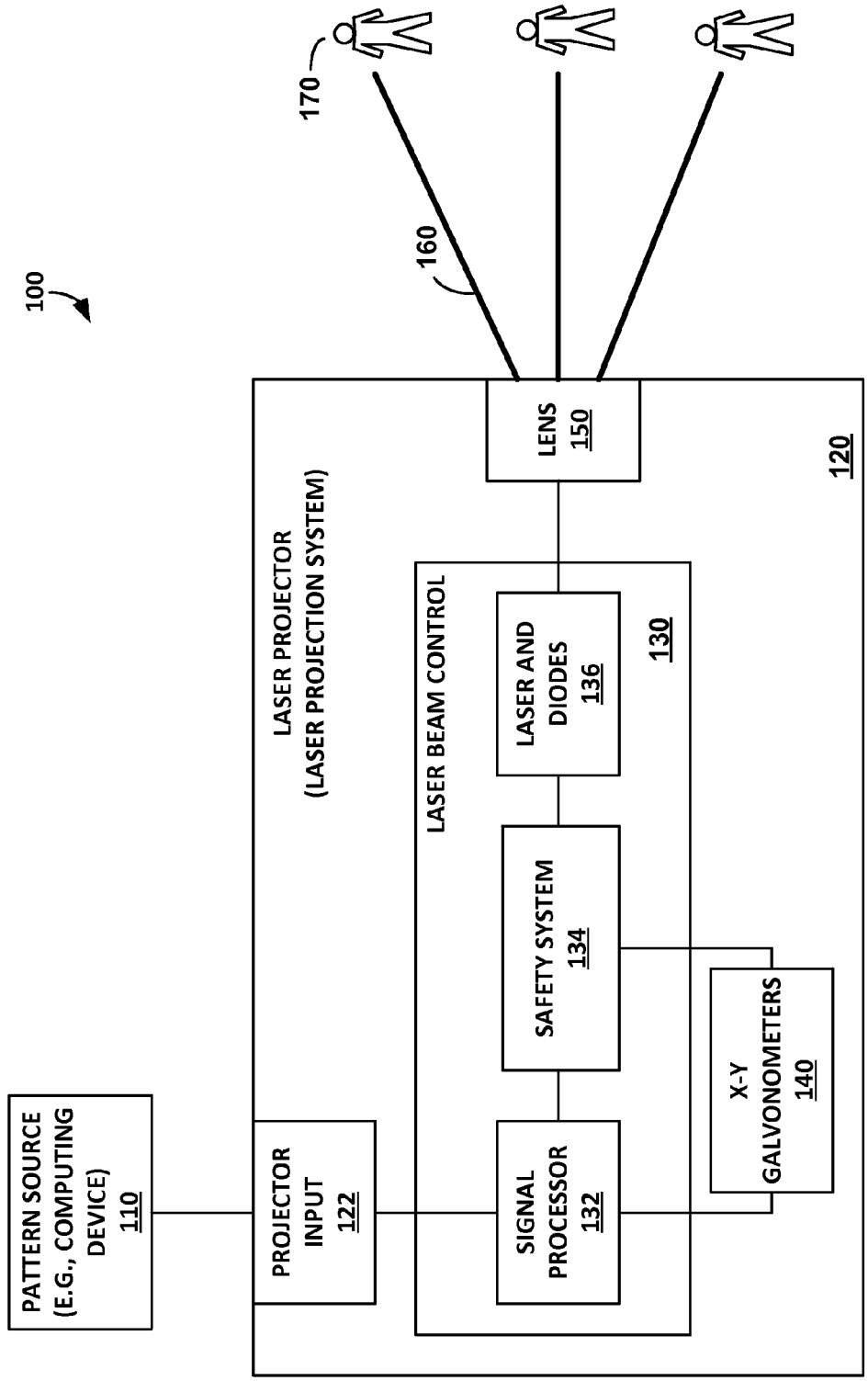
FIG. 1 is a block diagram illustrating an audience-scanning laser projection system, in accordance with an embodiment.

FIG. 1 is a block diagram illustrating a system 100 for producing audience-scanning (laser projected) effects. As shown in FIG. 1, the system 100 includes a pattern source 110 and a laser projector (an audience-scanning laser projector) 120. The laser projector 120 can be configured to produce laser beams 160 that are used to produce audience-scanning effects that are safely projected onto audience members 170.

In certain implementations, the pattern source 110 of the system 100 may take the form of a personal computer, a laptop computer, or other appropriate computing or programmable controller device. The pattern source 110 can include an appropriate interface for communicating with the laser projector 120, such as an analog interface or a digital interface (e.g., a parallel port, a Universal Serial Bus interface, a network interface, etc.). In other implementations, the pattern source 110 may be integrated in the laser projector 120, rather than being a separate device as is shown in FIG. 1.

In the system 100, the pattern source 110 may include software, hardware and/or firmware that is/are configured to provide one or more signals to the laser projector for producing images (image signals). These image signals can include signals (which can be referred to as sub-signals) that correspond to desired X-Y positions (e.g., on a Cartesian coordinate scan field of the laser projector 120) for projecting laser beams, signals (e.g., sub-signals) corresponding with a desired color (or colors) of projected laser beams at the desired X-Y positions, and signals (sub-signals) corresponding with a desired power (or respective powers) of the projected laser beams at the desired X-Y positions. The signals provided by the pattern source 110 may direct the laser projector 120 to produce desired images, including audience-scanning effects.

In the system 100, the laser projector 120 can include a projector input 122, a laser beam control module 130, X-Y galvanometers 140 and a lens 150. As shown in FIG. 1, the laser beam control module 130 can include a signal processor 132, a safety system 134 and a laser and diode module 136. The lens 150 may be a single focal length lens, or a multi-focal length lens, or may include multiple lenses. The lens 150 may be configured to increase or decrease the divergence of laser beams projected through the lens, increase or decrease the diameter of projected laser beam, diffract projected laser beams through optical gratings, etc. In some embodiments, the lens 150 may not be used. The approaches described herein can be used with the configurations described above, as well as with a number of other laser projector configurations.

In the laser projector 120 of FIG. 1, the projector input 122 may be configured to receive image signals from the pattern source 110, such as those described above, for producing images. Accordingly, the projector input 122 can include an appropriate (e.g., compatible) interface for receiving image signals from the pattern source 110. In implementations where the pattern source 110 is integrated with the laser projector 120, the projector input 122 could be omitted. In still other implementations, the laser projector 120 may include the projector input 122, as well as an integrated pattern source 110, and be capable of generating image signals internally or receiving image signals from an external source.

In the implementation shown in FIG. 1, the projector input 122 may provide image signals received from the pattern source 110 to the signal processor 132. Depending on the particular implementation, the signal processor 132 can include a digital signal processor, an analog-to-digital converter and/or a digital to analog converter, as well as a number of other signal processing devices, as appropriate for a given implementation.

In the system 100, the signal processor 132 may provide processed image signals to the X-Y galvanometers 140 and the safety system 134. For example. The signal processor 132 can provide an X-Y component of the processed image signals to the X-Y galvanometers 140 and also provide associated processed image signals corresponding to desired color and laser power to the safety system 134. In other implementations, the processed signals may be communicated as appropriate for a given implementation.

The safety system 134 may be configured to implement one or more safety parameters related to safe projection of audience-scanning (laser) effects. For instance, the safety system 134 may implement safety parameters that guarantee a maximum irradiance (which can be referred to as maximum permissible exposure (MPE)) of the laser beams 160 produced by the laser projector 120 that may occur at any given point in a viewer or audience area (e.g., which points may be determined based on (correspond with) a Cartesian coordinate scan field of the laser projector 120) is not exceeded. The specific safety parameters that are implemented by the safety system 134 will depend on the specific implementation and/or can be based on the specific MPE requirement, such as defined by an appropriate regulatory agency. For example, a laser beam with an initial diameter of 3 mm, an optical power of 500 milliwatts (mW), and a known beam divergence angle of 8 milliradians, could be scanned at an angular velocity sufficient to reach an exposure time of 1 millisecond at the audience location. The corresponding MPE for this scenario could be specified as an irradiance of 10 mW/cm2, where the beam irradiance in this example would be approximately 9.2 mW/cm2, therefore making the beam safe for audience-scanning per the specified MPE criteria.

For instance, in certain embodiments, safety parameters to ensure that a specified MPE level is not exceeded may include a dwell time parameter (e.g., a maximum amount of time a laser beam can be projected at given X-Y position on the scan field of the laser projector 120), an angular velocity parameter (e.g., a minimum velocity of the beam moving across the scan field) and/or a maximum beam power for a laser beam that is projected at a given X-Y position (or a given set of X-Y positions) on the scan field. In the laser projector 120 shown in FIG. 1, if the safety system 134 determines that the safety parameters have been met (are adhered to), it may then provide the signals (sub-signals) corresponding to color and laser power (e.g., for an associated X-Y position signal) to the laser and diodes 136 for projecting a given image (or portion of an image) to the laser and diodes 136. The laser and diodes 136 may then generate a laser beam of the specified color and power, which mirrors of the X-Y galvanometers 140 can direct (at the desired X-Y position) through the lens 150 and into a venue in which the laser projector 120 is being used (e.g., to produce an audience-scanning effect). However, if the safety system 134 determines that the safety parameters of the safety system 134 have been violated, the safety system 134 may not provide the signals relating to laser power and color to the laser and diodes 136, or may disable (at least temporarily) the laser and diodes 136, effectively preventing the laser and diodes 136 from generating an unsafe audience-scanning effect. Such an approach may be referred to as failing safe, as the laser and diodes 136 are disabled when the safety system 134 determines that one or more of its safety parameters have been violated.

In certain implementations, additional safety parameters that can be verified to ensure safe projection of audience-scanning effects (e.g., to ensure a specified MPE level is not exceeded) may include a minimum distance that the laser projector 120 must be located from a closest point of viewer or audience access. This distance can be determined in a number of ways. For example, a laser range finder could be used to determine a distance from the laser projector 122 the closest point of viewer or audience access. Alternatively, as is discussed further below with respect to FIG. 4A, a beam width of the laser beam projected by the laser projector 120 can be measured at the closest point of viewer or audience access, and the distance between the two can be determined based on the measured beam width and a fixed (known) laser beam divergence of the laser projector 120. As yet another alternative, the distance from the laser projector 120 to the closest point of viewer or audience access could be measured using a number of other approaches. In such an approach, if it is determined that the distance from the laser projector 120 to the nearest point of viewer of audience access is less than the specified minimum distance, the laser projector 120 can be moved to a new location that complies with the minimum distance requirement.

Figure 2A:
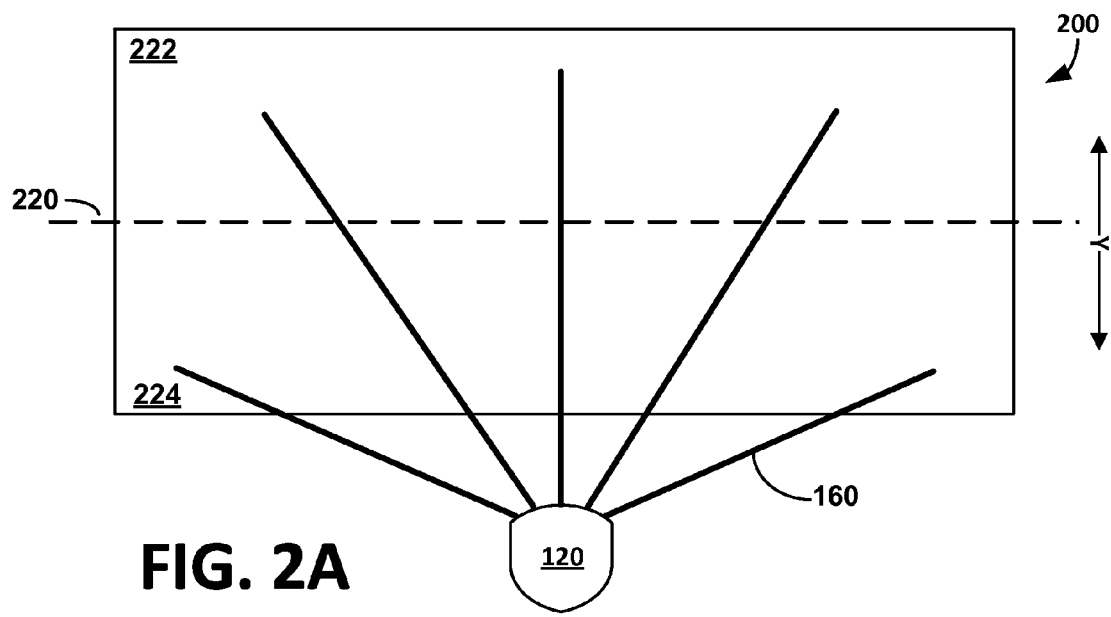
FIGS. 2A and 2B are diagrams schematically illustrating projection fields of a laser projector, according to an example embodiment.
Figure 2B:
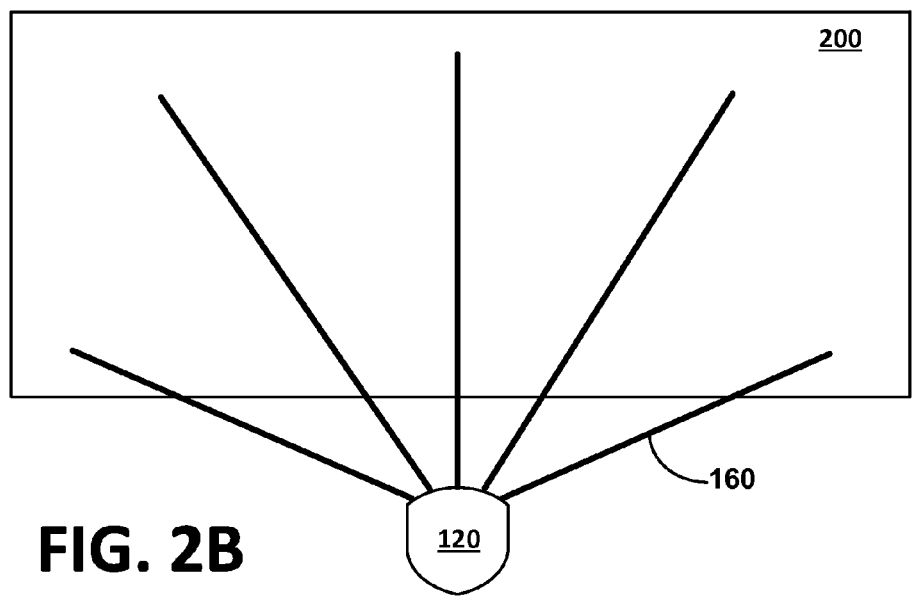

FIGS. 2A and 2B are diagrams schematically illustrating projection scan fields 200 and 200' of a laser projector, according to an example embodiment. In FIGS. 2A and 2B, the laser projector is referenced with the same reference number (120) as in FIG. 1 for illustrative purposes. In some implementations, however, laser projectors having other configurations can be used in place of the laser projector 120.

As shown in FIGS. 2A and 2B, the scan fields 200 and 200' may be a geometric pattern, such as a rectangle, as is illustrated in the drawings. In other implementations, the scan fields 200 and 200' may be implemented in different shapes, such as a square, a circle, a triangle, and so forth. As indicated above, the laser projector 120 can use a Cartesian coordinate system to define specific locations on the scan field 200 for projection of laser beams 160, e.g., to project images in accordance with image signals provided to (or produced by) the laser projector 120.

As shown in FIG. 2, the laser projector 120 can define a horizon line 220 that divides the scan field 200 into an unprotected area 222 and a protected area 224. In certain implementations, the safety system 134 of the laser projector 120 may be configured to implement a set of safety parameters (such as those described herein) in the protected area 224, but not in the unprotected area 222. When used in a particular venue, the horizon line 220 may be set to be at a given distance above a viewer or audience area, so that the viewer or audience area is located within the protected area 224 of the scan field 200 when the laser projector 120 is operating and producing audience-scanning effects. In such implementations, the unprotected area 222 would be above the viewer or audience area and, therefore, enforcement or implementation of the safety parameters of the safety system 134 is not needed in the unprotected area 222.

A horizon line, such as the horizon line 220 in FIG. 2A, can be implemented as a digital horizon line that is defined by the laser projector 120, such as by the safety system 134, for example. In other implementations, the horizon line 220 can be implemented optically, such as by using a bifocal lens for the lens 150 of the laser projector 120, where a focal length of a portion of the lens 150 corresponding with the protected area 224 (e.g., a bottom half of the lens 150) is longer than a focal length of a portion of the lens 150 corresponding with the unprotected area 222 (e.g., a top half of the lens 150).

Using such a bifocal lens would increase divergence of the laser beams 160 projected in the protected area 224 as compared to divergence of the laser beams 160 projected in the unprotected area 222, which would reduce risk of retinal damage, or other injury in the protected are 224 as compared with the unprotected area 222. In some implementations, the horizon line 220 can be implemented digitally and/or optically and/or at different positions along a y-axis of the scan field 200 than shown in FIG. 2A. For example, the horizon line could define the protected area as the lower 25% (or less) of the scan field 200, as the lower 75% (or more) of the scan field 200. In other implementations, the horizon line 200 can be defined at still other positions along the y-axis of the scan field 200.

In FIG. 2B, as compared to FIG. 2A, the entire scan field 200' of the laser projector 120 can be defined as a protected area. Such an approach may be beneficial in venues where it is difficult, or not possible, to set the horizon line 220 of FIG. 2A at a safe distance above the viewing or audience area. As with the protected area 224 of the scan field 200 in FIG. 2A, the scan field 200' in FIG. 2B may be defined digitally (e.g., by the safety system 134 of the laser projector 120) and/or optically by the lens 150.

Figure 3:
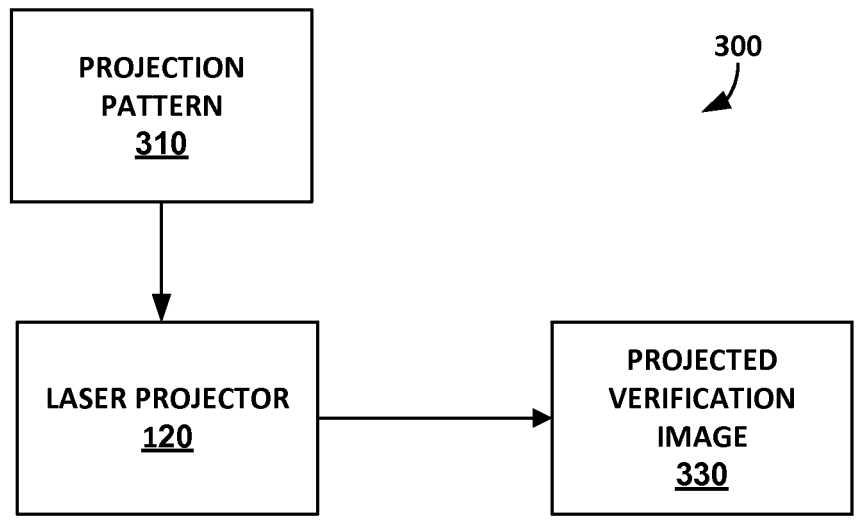
FIG. 3 is a diagram illustrating signal flow illustrating a method for verifying operation of a safety system of a laser projector, according to an embodiment.

FIG. 3 is a diagram 300 illustrating a signal flow for a method of verifying operation of a safety system of a laser projector, according to an embodiment. For purposes of illustration and clarity, the following discussion of FIG. 3 is made with further reference to FIG. 1. It will be appreciated, however, that the approach illustrated in FIG. 3 can be implemented with laser projectors having other configurations than the laser projector 120, such as a laser projector that includes an integrated pattern source 110.

In the diagram 300, image signals for a projection pattern 310 are provided to the laser projector 120. The projection pattern 310 may be a pattern that is defined or configured to violate (which may also be referred to as aggravate) one or more safety parameters of the safety system 134 of the laser projector 120. After receiving the image signals of the projection pattern 310 (e.g., from the pattern source 110), the laser projector 120 can then generate a projected verification image 330 based on the received image signals for the projection pattern 310.

In the signal flow of FIG. 3, the projection pattern 310 may be configured such that proper implementation of the one of more safety parameters can be determined by inspection of the projected verification image 330. For example, inspection of the projected verification image can include visual inspection by a user of the laser projector 120. In other words, if the safety system 134 of the laser projector 120 is operating properly, the projected verification image 330 may appear visually different than as it was defined on (using, with) the pattern source 110, and different than a pattern directly corresponding with the image signals for the projection pattern 310 provided to the laser projector 120. In this situation, the safety system 134 may prevent the laser projector 120 from projecting at least a portion of the projection pattern 310 that violate (aggravate) the one or more safety parameters that the projection pattern 310 was designed to violate (aggravate), thus making proper implementation of those one or more safety parameters readily apparent, e.g., by visual inspection of the projected verification pattern 330. Examples of projection patterns that can be used in the logic flow of the diagram 300 are illustrated in FIGS. 4-D and discussed below.

In comparison, if the safety system 134 of the laser projector 120 is not operating properly (e.g., not properly implementing the one or more safety parameters), the projected verification image 330 corresponding with the projection pattern 310 may appear as it was originally defined on (with, using) the pattern source 110, and also appear differently than it would if the safety system 134 was operating properly.

Therefore, in this situation, it would be readily apparent that the safety system 134 is not properly implementing the one or more safety parameters that the projection pattern 310 is intended to violate (aggravate) based on inspection of the projected verification image 330, e.g., visual inspection by a user of the laser projector 120.

The signal flow of FIG. 3 can be used with a plurality of projection patterns 310, where each of the plurality of projection patterns 310 is configured to violate (aggravate) at least one safety parameter of the safety system 134. In certain implementations, each projection pattern 310 may be configured to violate (aggravate) a different, respective safety parameter of the safety system 134. In such approaches, sequential display of the respective projected verification images 300 corresponding with each of the plurality of projections patterns 310 (and inspection of those patterns to ensure proper implementation of their respective safety parameter) may be performed to verify (validate) proper operation of the safety system 134 and compliance with a specified MPE level associated with the safety parameters implemented by the safety system 134.

FIGS. 4A-4D are diagrams illustrating projection patterns (which may also be referred to as test patterns) for use in verifying operation of a safety system and safe operation of an audience-scanning laser projector, according to various embodiments. For purposes of illustration and clarity, the following discussion of FIGS. 4A-4D is made with further reference to FIGS. 1-3. It will be appreciated, however, that the projection (test patterns) illustrated in FIGS. 4A-4D can be implemented with laser projectors having other configurations than the laser projector 120, such as a laser projector that includes an integrated pattern source 110.

The patterns shown in FIGS. 4A-4D can be used in conjunction with the signal flow of FIG. 3, or can be used in conjunction with other signal flows used for verifying safe operation of an audience-scanning laser projector. Further, the signal flow of FIG. 3 and the methods of FIGS. 5 and 6, which are discussed below, may be implemented using the patterns of FIGS. 4A-4D, or can be implemented with other patterns that are configured to violate (aggravate) one or more safety parameters of a safety system and/or configured to verify compliance with at least one component of a specific MPE criteria, e.g., such as irradiance of laser beam at a closet point of human (viewer, audience, etc.) access during projection of audience-scanning effects.

In this example, the projection patterns illustrated in FIGS. 4A-4D can be used to verify proper operation of the safety system 134 of the laser projector 120, where the laser projector 120 implements the scan field 200, as illustrated in FIG. 2A. That is in this example, the laser projector 120 may digitally implement (e.g., by the safety system 134) the horizon line 220 of the scan field 200, so as to define the unprotected area 222 and the protected area 224. Further, the patterns of FIGS. 4A-4D can be used to verify proper operation, or identify improper operation, of the safety system 134 and to determine whether the laser projector 120 is safe to use to project audience scanning effects in a viewer (audience) area. This verification process may be carried out during a setup process for the laser projector 120 in a venue where laser projector 120 will be used to produce such audience-scanning effects.

In this example, the patterns of FIGS. 4A-4D can be used to verify that a given MPE specification is met (or not met) by using a first projection pattern (shown in FIG. 4A) that is configured to violate a dwell time parameter of the safety system 134, a second projection pattern (shown in FIGS. 4B and 4C) that is configured to violate an angular velocity parameter of the safety system 134 and a third projection pattern (FIG. 4D) that can be used to determine that the laser projector 120 is located such that a specific minimum distance to a closet point of viewer (audience) access, e.g., during projection of one or more audience scanning effects, is met. In other implementations, other patterns can be used to verify that the given MPE specification is met. In still other implementations, the test patterns of FIGS. 4A-4D, or other appropriate test patterns can be used to verify that different MPE specifications are met, using the same and/or different safety parameters.

Figure 4A:
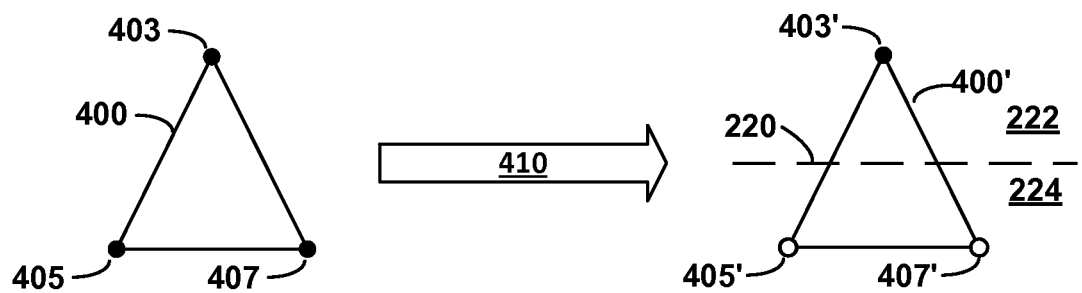
FIGS. 4A-4D are diagrams illustrating test patterns for use in verifying operation of a safety system and safe operation of an audience-scanning laser projector, according to various embodiments.

As indicated above, FIG. 4A illustrates a test (projection) pattern 400 that is configured to violate (aggravate) a dwell time parameter (e.g., a first safety parameter) of the safety system 134 of the laser projector 120. In this example, the dwell time parameter can be defined as a maximum amount of time a laser beam can be projected at a given X-Y location on the scan field 200 within the protected area 224. As shown in FIG. 4A, the projection pattern 400 includes "anchor" points 403, 405 and 407 at its corners.

In the projection pattern 400, the anchor points 403, 405 and 407 may be defined (e.g., on the pattern source 110) such that they violate a specified dwell time parameter of the safety system 134. In other words, the anchor points 403, 405 and 407 may be defined so a laser beam of the laser projector will be projected at, or remain at, the X-Y locations on the scan field 200 corresponding with the anchor points 403, 405 and 407 for a period of time that exceeds the dwell time parameter of the safety system 134.

Following the signal flow 300 of FIG. 3, image signals 410 corresponding with the projection pattern 400 can then be provided (communicated) to the laser projector 120. The laser projector 120 may then use the provided image signals 410 to project the image 400' (e.g., as the projected verification image 330 of FIG. 3). As shown in FIG. 4A, the image 400' includes corner points 403', 405' and 407', which correspond, respectively, with the anchor points 403, 405 and 407 of the projection pattern 400. As shown in FIG. 4A, the corner point 403' is within the unprotected area 222 (e.g., is above the horizon line 220), while the corner points 405' and 407' are within the protected area 224 (e.g., are below the horizon line 220).

In FIG. 4A, the image 403' is illustrated as it would appear if the safety system 134 is properly implementing its dwell time parameter. For instance, the corner points 405' and 407' are shown as hollow circles to indicate that they would not be displayed, or would be displayed significantly dimmer than the corner point 403', which is within the unprotected region 222 and may not be subject to (evaluated for compliance with) the dwell time parameter. If the safety system 134 were not working properly, the corner points 405' and 407' of the projected image 400' may be displayed as they were defined in the image signal 410 (and the image 400) and, therefore, be displayed with substantially the same brightness as the corner point 403'.

In certain implementations, the pattern 400 could take other forms. For instance, the pattern 400 could be a rectangle, a square, a trapezoid, and so forth, with anchor points defined at its corners, or at other locations on the pattern. In other implementations, other patterns could be used, such as an image that violates the dwell time parameter and is mirrored above and below the horizon line 220. In such an approach, if the safety system 134 is properly implementing the dwell time parameter, the portion of the mirrored image below the horizon line 220 would not be displayed, or may be displayed significantly dimmer than the portion of the image above the horizon line 220.

Figure 4B:
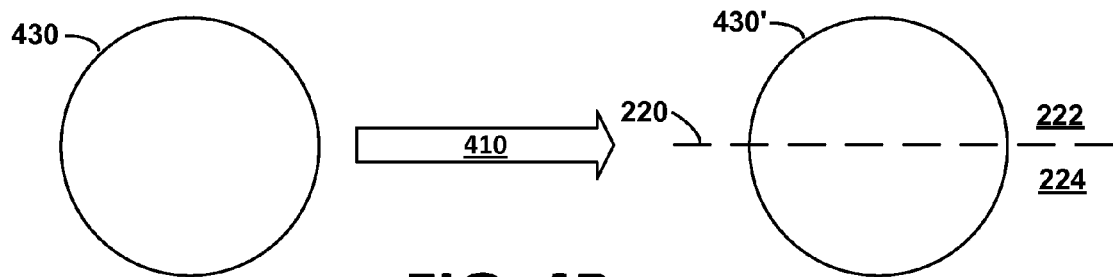
Figure 4C:
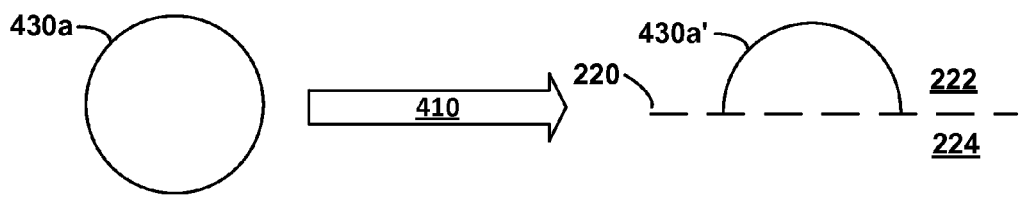

As indicated above, FIGS. 4B and 4C illustrate a test (projection) pattern 400 that is configured to violate (aggravate) an angular velocity parameter (e.g., second safety parameter) of the safety system 134 of the laser projector 120. In this example, the angular velocity parameter can be defined as a minimum rate (velocity) of movement of a projected laser beam across the scan field 200 within the protected area 224.

As shown in FIGS. 4B and 4C, the projection (test) pattern for verifying that the safety system 134 is properly implementing an angular velocity safety parameter may be a dynamic (animated) circle that changes from a first size, as shown by the pattern 430 in FIG. 4B, to a second size, that is smaller than the first size, as shown by the pattern 430a in FIG. 4C. In such an approach, the test pattern of FIGS. 4B and 4C may be configured to comply with the angular velocity parameter when displayed at the first size as shown in FIG. 4B, and violate the angular velocity parameter when displayed at the second size as shown in FIG. 4C.

As shown in FIG. 4B, and following the signal flow of FIG. 3, image signals 410 corresponding with the projection pattern 430 may be provided to the laser projector 120 and the laser projector 120 may produce the image 430' as the projected verification image 330 of FIG. 3. In this example, the pattern source 110 may provide additional image signals 410 that result in the projected image of the circle of FIG. 4B to shrink in size until the image 430a' of FIG. 4C (which is configured to violate the angular velocity parameter of the safety system 134) is projected by the laser projector 120.

In this example, the image 430a' shown in FIG. 4C is illustrated as it would appear if the safety system 134 of the laser projector 120 is properly implementing its angular velocity parameter. For instance, the portion of the circle defined by the image signals 410 that correspond with the projection pattern 430a that would be within the protected region 224 is not displayed, while the portion of the pattern 430a' that is within the unprotected region 222, and may not be subject to the angular velocity requirement, is displayed. If the safety system 134 were not working properly, the bottom portion of the projected image 430a' (within the protected region 224) may be displayed, as defined in the image signals 410 for the projection pattern 430a, even though the angular velocity parameter of the safety system 134 is violated by that pattern.

In certain implementations, the patterns 430 and 430a could take other forms. For instance, the patterns 430 and 430a could be rectangles, squares, trapezoids, and so forth, where the patterns are animated to shrink from a first size (pattern 430) that does not violate the angular velocity parameter of the safety system 134 to a second size (pattern 430a) that does violate the angular velocity parameter.

Figure 4D:
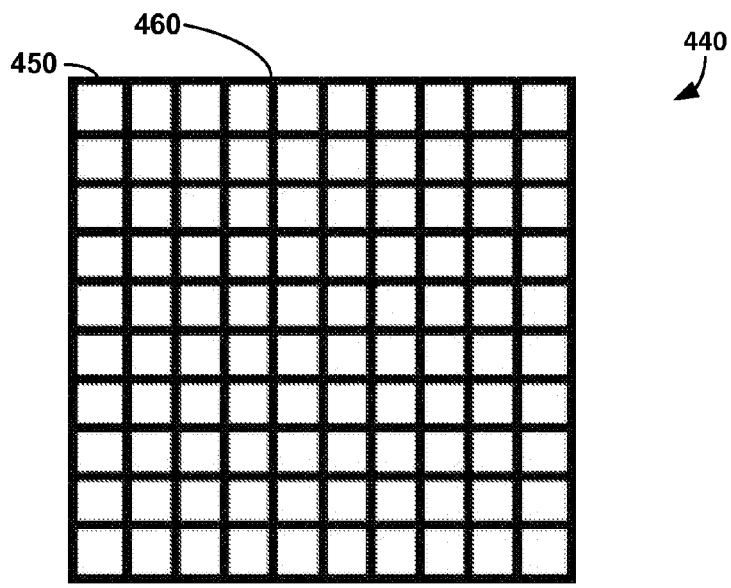

FIG. 4D illustrates a pattern 440 that can be used to verify, e.g., prior to admission of an audience, that the laser projector 120 is located at a minimum distance from a closest point of audience access. As shown in FIG. 4D, the pattern 440 is a checkerboard pattern that may be projected onto a surface at the closest point of audience access to the laser projector 120. When the pattern 440 is projected and displayed on the surface, a width of a projected laser beam 450 can be measured. This measured width can then be used to calculate (e.g., using a simple trigonometric function) the distance from the laser projector 120 based on a known divergence of laser beams 450 projected by the laser projector 120. By verifying the closest point of audience access to the laser projector 120 complies with a minimum distance requirement can ensure that a specified MPE criteria is met, as irradiance (power/unit area) of laser beams projected at the closest point of audience can be determined from beam power (which is a known value for a given laser projector), divergence of the laser beams and the distance from the laser projector (again using trigonometric functions to determine an area of the beam).

In such an approach, laser beam width should not be measured at an intersection point 460 of the pattern 440, as such a measurement could yield a beam width measurement that is greater than the width of a single laser beam (e.g., the laser beam 450). This could lead to a conclusion that the minimum distance requirement is met, when in fact the closest point of audience access to the laser projector 120 is less than the specified minimum distance. In other approaches, the distance from the laser projector 120 to the closest point of audience access can be measured in other manners. For example, a laser range finder could be used. In other implementations, other approaches for determining the distance from the laser projector to the closest point of audience access can be used.

Figure 5:
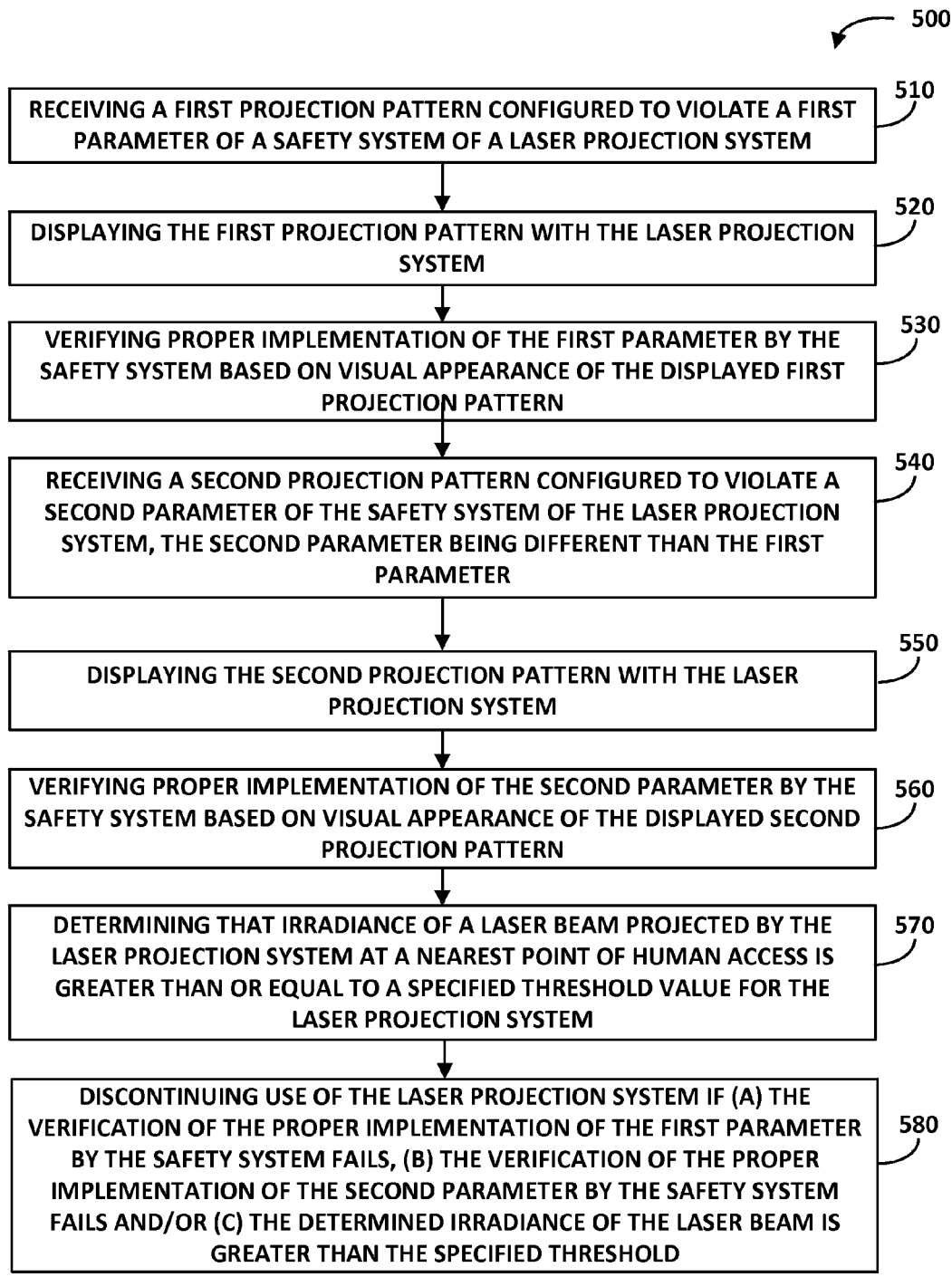
FIG. 5 is a flowchart illustrating a method for verifying operation of a safety system of an audience-scanning laser projector, according to an embodiment.

FIG. 5 is a flowchart illustrating a method 500 for verifying operation of a safety system of an audience-scanning laser projector, according to an embodiment. The method 500 can be implemented using, for example, the apparatus and techniques described herein. The operations of the method 500 are given by way of illustration and in other implementations, one or more of the operations of the method 500 can be omitted, and/or one or more additional operations can be added to the method 500. As appropriate, the method 500 will, for purposes of illustration, be described with additional reference to FIGS. 1-4D.

As shown in FIG. 5, the method 500 includes, at block 510, receiving, e.g., at the laser projection system 120, a first projection pattern (e.g., as image signals 410). The first projection pattern can be configured to violate a first parameter (e.g., a dwell time parameter) of the safety system 134 of the laser projection system 120. For example, the projection pattern of block 510 can be the projection pattern 400 of FIG. 4A, though other patterns may be used. At block 520, the method 500 includes displaying the first projection pattern with the laser projection system 120, such as to produce a projected verification pattern 330 corresponding with the projection pattern of block 510. At block 530, the method 500 includes verifying proper implementation of the first parameter by the safety system 134 based on visual appearance of the displayed first projection pattern, such as was discussed with respect the pattern 400' of FIG. 4A. For example, a user of the laser projector 120 may visually inspect the projected verification pattern of block 520 to verify proper or improper implementation of the first safety parameter by the safety system 134.

The method 500 further includes, at block 540, receiving, e.g., at the laser projector 120, a second projection (test) pattern (e.g., as image signals 410). The second projection (test) pattern can be configured to violate a second parameter (e.g., an angular velocity parameter) of the safety system 134 of the laser projection system 120. For example, the projection pattern of block 540 can be the animated projection pattern of FIGS. 4B and 4C, such as illustrated by the patterns 430 and 430a, though other patterns may be used. At block 550, the method 500 includes displaying the second (animated) projection pattern with the laser projection system 120, such as to produce a projected (animated) verification pattern (as illustrated by patterns 430' and 430a') corresponding with the (animated) projection pattern of block 540. At block 560, the method 500 includes verifying proper implementation of the first parameter by the safety system based on visual appearance of the displayed second (animated) projection pattern, such as was discussed with respect the patterns 430' and 430a' of FIGS. 4B and 4C. For example, a user of the laser projector 120 may visually inspect the projected (animated) verification pattern of block 540 to verify proper or improper implementation of the safety parameter by the safety system 134, e.g., such as was discussed above with respect to FIGS. 4B and 4C.

At block 570, the method 500 can further include determining that irradiance of a laser beam projected by the laser projector 120 at a nearest point of human access to the laser projector 120 is less than or equal to a specified threshold value for the laser projector 120. As discussed above, this determination of irradiance may be achieved by verifying that the nearest point of human (audience) access to the laser projector 120 is greater than or equal to a minimum specified distance threshold.

As discussed above with respect to FIG. 4D, the determining at block 570 can include measuring a distance from a lens of the laser projector 120 to the nearest point of human access and using a trigonometric function to calculate an irradiance value. Alternatively, as also discussed above with respect to FIG. 4D, the determining at block 570 can include measuring a width of a laser beam 450 projected by the laser projection system 120 at the nearest point of human access and use a trigonometric function to determine the distance and irradiance.

At block 580, the method 500 further includes discontinuing use of the laser projector 120 if (a) at block 530, the verification of the proper implementation of the first parameter by the safety system fails, (b) at block 560, the verification of the proper implementation of the second parameter by the safety system fails and/or (c) at block 570, the determined irradiance of the laser beam is greater than the specified threshold. In certain embodiments, the operations 570 and 580 can be omitted from the method 500. In such approaches, use of the laser projector 120 may be discontinued if (a) at block 530, the verification of the proper implementation of the first parameter by the safety system fails and/or (b) at block 560, the verification of the proper implementation of the second parameter by the safety system fails.

Figure 6:
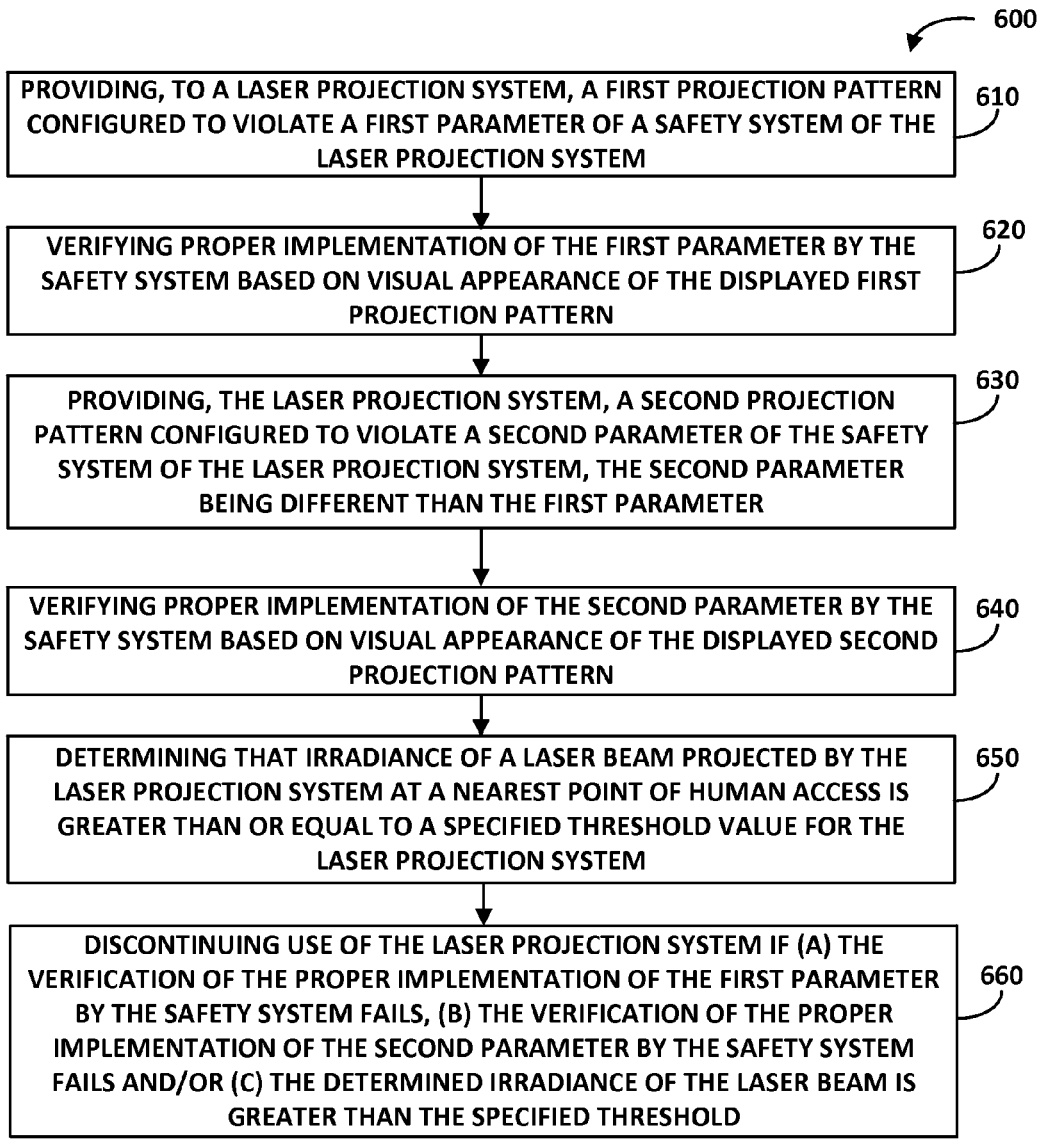
FIG. 6 is a flowchart illustrating another method for verifying operation of a safety system of an audience-scanning laser projector, according to an embodiment.

FIG. 6 is a flowchart illustrating another method 600 for verifying operation of a safety system of an audience-scanning laser projector, according to an embodiment. As with the method 500, the method 600 can be implemented using, for example, the apparatus and techniques described herein. The operations of the method 600 are given by way of illustration and in other implementations, one or more of the operations of the method 600 can be omitted, and/or one or more additional operations can be added to the method 600. As appropriate, as with the method 500, the method 600 will, for purposes of illustration, be described with additional reference to FIGS. 1-4D.

At block 610, the method 600 includes providing, e.g., from the pattern source 110 to the laser projector 120, a first projection pattern for display by the laser projector 120, where the first projection pattern is configured to violate a first parameter (e.g., a dwell time parameter) of a safety system of the laser projector 120. At block 620, the method 600 includes verifying proper implementation of the first parameter (e.g. the dwell time parameter) based on visual appearance of the first projection pattern as displayed by the laser projector. For example, a user of the laser projector 120 may visually inspect the displayed first projection pattern, such as using the approaches described herein.

At block 630, the method 600 includes providing, e.g., from the pattern source 110 to the laser projector 120, a second projection pattern for display by the laser projector 120, where the second projection pattern is configured to violate a second parameter (e.g., an angular velocity parameter) of the safety system 134 of the laser projector 120. At block 640, the method 600 includes verifying proper implementation of the second parameter (e.g. the angular velocity parameter) based on visual appearance of the second projection pattern as displayed by the laser projector 120. For example, a user of the laser projector 120 may visually inspect the displayed second projection pattern, such as using the approaches described herein.

At block 660, the method 600 further includes discontinuing use of the laser projector 120 if (a) at block 620, the verification of the proper implementation of the first parameter fails (b) at block 640, the verification of the proper implementation of the second parameter fails and/or (c) at block 650, the determined irradiance of the laser beam is greater than the specified threshold. Similar to the method 500, in certain embodiments, the operations 650 and 660 can be omitted from the method 600. In such approaches, use of the laser projector 120 may be discontinued if (a) at block 620, the verification of the proper implementation of the first parameter by the safety system fails and/or (b) at block 640, the verification of the proper implementation of the second parameter by the safety system fails.

As discussed above (e.g., with respect to FIG. 4D), the determining at block 650 can include providing, to the laser projector 120, a third projection pattern (e.g., the pattern 440 of FIG. 4D) for display by the laser projector 120 and determining, based on a measured beam width in the third projection pattern, as displayed by the laser projector 120, that irradiance of a projected laser beam of the laser projector 120 at the nearest point of audience access is less than or equal to a specified threshold value for the laser projector 130, or a specified MPE for use of laser projected audience-scanning effects.

Implementations of the various techniques described herein may be implemented in analog circuitry, digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer (or device) or on multiple computers (or devices) at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer or device. Generally, a processor will receive instructions and data from a read-only memory or a random access memory or both. Elements of a computer or device may include at least one processor for executing instructions and one or more memory devices for storing instructions and data. Generally, a computer or device also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD) monitor or a light emitting diode (LED) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method comprising:
    receiving, at a laser projection system, a first projection pattern, the first projection pattern being configured to violate a first parameter of a safety system of the laser projection system;
    displaying the first projection pattern with the laser projection system;
    verifying proper implementation of the first parameter by the safety system based on visual appearance of the displayed first projection pattern;
    receiving, at the laser projection system, a second projection pattern, the second projection pattern being configured to violate a second parameter of the safety system of the laser projection system, the second parameter being different than the first parameter;
    displaying the second projection pattern with the laser projection system; and
    verifying proper implementation of the second parameter by the safety system based on visual appearance of the displayed second projection pattern.

2. The method of claim 1, wherein the method is performed prior to admission of an audience and projection of laser images onto the audience.

3. The method of claim 1, further comprising determining that irradiance of a laser beam projected by the laser projection system at a nearest point of human access is less than or equal to a specified threshold value for the laser projection system.

4. The method of claim 3, wherein the determining includes measuring a distance from a lens of the laser projection system to the nearest point of human access.

5. The method of claim 3, wherein the determining includes measuring a width of a laser beam projected by the laser projection system at the nearest point of human access.

6. The method of claim 3, further comprising, if at least one of the verification of the proper implementation of the first parameter by the safety system fails, the verification of the proper implementation of the second parameter by the safety system fails or the determined irradiance of the laser beam is greater than the specified threshold:
    discontinuing use of the laser projection system.

7. The method of claim 1, wherein the first parameter is a dwell time threshold, the first projection pattern including a geometric shape having at least one point that, if projected, would exceed the dwell time threshold.

8. The method of claim 7, wherein the first projection pattern is a triangle with corners that, if projected, would exceed the dwell time threshold, the verifying proper implementation of the first parameter includes verifying that at least one corner of the triangle, when displayed, is dimmer than at least one other corner of the triangle.

9. The method of claim 8, wherein the at least one corner of the triangle that is dimmer is displayed in a protected region of a scan field of the laser projection system.

10. The method of claim 1, wherein the second parameter is an angular velocity threshold, the second projection pattern including a geometric shape that collapses from a first size to a second size, the display of the second projection pattern at the second size corresponding with a laser beam angular velocity below the angular velocity threshold.

11. The method of claim 10, wherein the second pattern is a circle, the verifying proper implementation of the second parameter includes verifying that a portion of the circle at the second size is not displayed.

12. The method of claim 11, wherein the portion of the circle at the second size that is not displayed corresponds with a protected region of a scan field of the laser projection system.

13. The method of claim 1, further comprising, if at least one of the verification of the proper implementation of the first parameter fails or the verification of the proper implementation of the second parameter fails:
    discontinuing use of the laser projection system.

14. A method comprising:
    providing, to a laser projection system, a first projection pattern for display by the laser projection system, the first projection pattern being configured to violate a first parameter of a safety system of the laser projection system;
    verifying proper implementation of the first parameter based on visual appearance of the first projection pattern as displayed by the laser projection system;
    providing, to the laser projection system, a second projection pattern for display by the laser projection system, the second projection pattern being configured to violate a second parameter of the safety system of the laser projection system, the second parameter being different than the first parameter; and
    verifying proper implementation of the second parameter based on visual appearance of the displayed second projection pattern as displayed by the laser projection system.

15. The method of claim 14, further comprising, if at least one of the verification of the proper implementation of the first parameter fails or the verification of the proper implementation of the second parameter fails:
discontinuing use of the laser projection system.

16. The method of claim 14, further comprising:
providing, to the laser projection system, a third projection pattern for display by the laser projection system; and
determining, based on the third projection pattern as displayed by the laser projection system, that irradiance of a laser beam of the laser projection system is less than or equal to a specified threshold value for the laser projection.

17. The method of claim 16, further comprising, if at least one of the verification of the proper implementation of the first parameter fails, the verification of the proper implementation of the second parameter fails or the irradiance of the laser beam is greater than the specified threshold:
discontinuing use of the laser projection system.

18. A system, comprising:
a laser projector including:
a laser;
an x-y scanning module; and
a safety system configured to implement a plurality of safety parameters; and
a computing device including at least one processor and a non-transitory machine-readable medium having instructions stored thereon, the instructions, when executed by the at least one processor, causing the computing device to:
provide, to the laser projector, a first projection pattern for display by the laser projector and verification of proper implementation of a first parameter of the plurality of parameters of the safety system, the first projection pattern being configured to violate the first parameter; and
provide, to the laser projector, a second projection pattern for display by the laser projector and verification of proper implementation of a second parameter of the plurality of parameters of the safety system, the second projection pattern being configured to violate the second parameter.

19. The system of claim 18, wherein the first parameter is an angular velocity threshold for the laser.

20. The system of claim 18, wherein the second parameter is a dwell time threshold for the laser.

21. The system of claim 18, wherein the verification of the first projection patter and the verification of the second projection pattern includes visual inspection by a user in an event venue prior to arrival of at least one event attendee.

* * * * *

UNITED STATES PATENT AND TRADEMARK OFFICE
CERTIFICATE OF CORRECTION

PATENT NO. : 9,268,204 B2  
APPLICATION NO. : 14/332280  
DATED : February 23, 2016  
INVENTOR(S) : Daniel Goldsmith et al.

Page 1 of 1

It is certified that error appears in the above-identified patent and that said Letters Patent is hereby corrected as shown below:

In the claims,
In column 18, line 20, in claim 21, delete "patter" and insert -- pattern --, therefor.

Signed and Sealed this
Second Day of August, 2016

Michelle K. Lee
*Director of the United States Patent and Trademark Office*